(12) United States Patent
Sorias et al.

(10) Patent No.: US 9,977,462 B2
(45) Date of Patent: May 22, 2018

(54) UNIVERSAL PHONE BATTERY CHARGERS FOR MOBILE CELLPHONES AND LIKE DEVICES

(71) Applicant: Techlar LLC, Brooklyn, NY (US)

(72) Inventors: Yeoshua Sorias, Brooklyn, NY (US); Max Moskowitz, Flushing, NY (US)

(73) Assignee: WAFR IP LLC, Hillside, NJ (US)

( * ) Notice: Subject to any disclaimer, the term of this patent is extended or adjusted under 35 U.S.C. 154(b) by 0 days. days.

(21) Appl. No.: 15/667,764

(22) Filed: Aug. 3, 2017

(65) Prior Publication Data

US 2018/0074550 A1    Mar. 15, 2018

Related U.S. Application Data

(60) Provisional application No. 62/385,419, filed on Sep. 9, 2016.

(51) Int. Cl.
| | | |
|---|---|---|
| *G06F 1/16* | (2006.01) | |
| *H04M 1/02* | (2006.01) | |
| *H02J 7/00* | (2006.01) | |
| *H02J 7/02* | (2016.01) | |

(52) U.S. Cl.
CPC .......... *G06F 1/1632* (2013.01); *H02J 7/0044* (2013.01); *H02J 7/0045* (2013.01); *H02J 7/02* (2013.01); *H04M 1/0274* (2013.01)

(58) Field of Classification Search
CPC .......... H02J 7/02; H02J 7/0042; H02J 7/0044; H02J 7/0045; H04M 1/0274; G06F 1/1632
See application file for complete search history.

(56) References Cited

U.S. PATENT DOCUMENTS

| | | | | |
|---|---|---|---|---|
| 9,197,726 B2 * | 11/2015 | Stanimirovic | ........ | H04M 1/215 |
| 9,495,375 B2 * | 11/2016 | Huang | .............. | H04W 52/0225 |
| 9,544,005 B2 * | 1/2017 | Wei | ........ | H04B 1/3883 |
| 9,742,885 B2 * | 8/2017 | Rostami | .................. | H02J 50/80 |
| 9,748,535 B2 * | 8/2017 | Huang | ................ | H01M 2/1022 |
| 9,755,444 B2 * | 9/2017 | To | ........ | H02J 7/0042 |

(Continued)

FOREIGN PATENT DOCUMENTS

| | | |
|---|---|---|
| CN | 204967340 U | 1/2016 |
| CN | 205029717 U | 2/2016 |
| KR | 20080070467 A | 7/2008 |

OTHER PUBLICATIONS

Notification of Transmittal of the International Search Report and the Written Opinion of the International Searching Authority, or the Declaration dated Dec. 7, 2017 in corresponding International Application No. PCT/US2017/050084.

*Primary Examiner* — Adrian S Wilson
(74) *Attorney, Agent, or Firm* — Ostrolenk Faber LLP

(57) ABSTRACT

A universal charging accessory for mobile devices. The accessory has a generally flat and thin body configured to lie flat against the flat rear side of the mobile device and includes an internal rechargeable battery, two charging plugs that are configured to be electronically coupled to the charging plug of the mobile device, with the charging plugs being retrievably stowed inside the body of the accessory and to be withdrawn as needed to charge the mobile device. The accessory has a window formed in the body of the charging accessory which receives, interchangeably, a plug-in module that can be inserted into an AC socket to charge the internal battery as well as the cellphone battery.

20 Claims, 14 Drawing Sheets

(56) References Cited

U.S. PATENT DOCUMENTS

| | | |
|---|---|---|
| 9,893,543 B2 * | 2/2018 | Miller .................. H02J 7/0054 |
| 2002/0022390 A1 | 2/2002 | Duerbaum et al. ........... 439/130 |
| 2002/0055288 A1 | 5/2002 | Philips et al. ................ 439/170 |
| 2009/0029581 A1 | 1/2009 | Klant et al. .................. 439/222 |
| 2013/0193911 A1 | 8/2013 | Miller et al. ................. 320/107 |
| 2014/0035511 A1 | 6/2014 | Ferber et al. ................ 320/103 |
| 2016/0049818 A1 | 2/2016 | Yao et al. |

* cited by examiner

UNIVERSAL PHONE BATTERY CHARGERS FOR MOBILE CELLPHONES AND LIKE DEVICES

CROSS-REFERENCE TO RELATED APPLICATION

This application claims the benefit and priority of U.S. Provisional patent application Ser. No. 62/385,419, filed Sep. 9, 2016 entitled UNIVERSAL PHONE CASE STYLE BATTERY CHARGER FOR MOBILE CELL PHONES AND LIKE DEVICES, the entire disclosure of which is incorporated herein by reference.

BACKGROUND OF THE INVENTION

The present invention is generally directed to battery chargers, optionally with an included auxiliary battery and, more particularly, to universal battery chargers for cellphones and like mobile devices that can be utilized with many different cellphone devices and which can be used with future mobile phones, substantially without regard to future cellphone configurations.

The general background and technology for the present invention is described in the present inventor's issued U.S. Pat. Nos. 9,413,179 and 9,088,670, the entire contents of which are incorporated by reference herein. The background art is also described in U.S. Pat. No. 9,130,384 and the entire contents of the U.S. Pat. No. 9,130,384 patent are also incorporated by reference herein.

In substantial part, the present invention is directed to improvements over the present inventor's disclosures in the aforementioned, incorporated by reference, U.S. Pat. Nos. 9,413,179 and 9,088,670 patents.

Among the drawbacks of the prior art, including the charger prior art described in the aforementioned patents, arises from the fact that the prior art chargers are provided in a packaging that doubles as a telephone case for the cellphone, whereby the telephone is installed into and integrated with the telephone chargers. In actuality, this results in very short shelf life telephone chargers, owing to the very rapid and constant changing of telephone designs. Another drawback of the prior art is that battery packs are provided in various configuration, usually as rectangular and lengthy "stick" shaped objects that are not conducive or comfortable to hold in a man's pocket or shirt pocket. Another drawback of the prior art chargers is associated with the fact that they typically require dangling cables with connectors on opposed ends that are required to be utilized between the telephone chargers or the battery pack and the mobile phone itself, leading to inconvenience or tangled wires and similar drawbacks.

SUMMARY OF THE INVENTION

Accordingly, it is an object of the present invention to provide a very slim, standardized, rectangularly shaped battery body that is very flat and thin and can be easily held against the back of a cellphone, carried in a shirt pocket, or even in a man's wallet and usable with virtually all mobile phones on the market.

It is a further object of the present invention to provide a standardized, slim form factor battery pack that is provided with a window in the battery body, for receiving a telephone charger that is suitable for charging both the battery pack and the internal battery of the cellphone.

It is a further object of the invention to provide a slim form factor battery with the aforementioned window, for interchangeably receiving in that window either a charging circuit or other accessories, for example an additional battery, or a data storage module and the like.

The foregoing and other objects of the invention are realized in accordance with the present invention by a universal charging accessory for mobile devices, that can be used with many different mobile devices, including future such devices. The charging accessory comprises: a generally flat and thin body configured to lie flat against the flat rear side of the mobile devices; an internal rechargeable battery mounted inside the body of the charging accessory; at least one mobile device charging plug configured to be electronically coupled to the charging port of the mobile devices, the at least one charging port being retrievably stowed inside the body; and the body having a thickness dimension of less than 8 mm. The charging accessory includes a recess formed in the body of the charging accessory, the recess being provided with a plurality of electrical contacts and the recess being configured for receiving a plug-in accessory therein that is electrically coupled to the charging accessory via said plurality of electrical contacts.

Preferably, the plug-in accessory is an AC charger that includes AC prongs configured to be inserted into a household AC socket and including an AC to DC converter circuit for converting AC power to DC power and to electrically contact with the electrical contacts of the recess to provide DC power to said internal battery. The AC prongs are configured to be able to plugged into a household AC socket having one of a United States, an Australia, a European, and a UK AC socket configuration. Other socket styles are also available. Also included is a charging circuit coupled electronically to the internal battery for converting electrical energy stored in said internal battery to a charging current for the mobile devices battery.

The charging accessory has an on/off switch and a charging level display configured to indicate a charge level of the internal battery and preferably first and second charging plugs for enabling selective charging of different type mobile devices. The first and second charging plug have a curved outer surface which matches a curved outer shape of the body of the charging accessory, so the battery/charger overall assembly has a smooth rectangular shape. Preferably, the plug-in accessory comprises charger contacts located in grooves formed in the plugin accessory to help to assist in preventing human contacts with said charger contacts.

Preferably, in one embodiment, the plug-in accessory has UK AC prongs including two prongs that fold down in one direction and a third prong folds in a direction perpendicular to the first direction and the plug-in accessory measures less than 8 mm in thickness. In one embodiment, where the plug-in accessory comprises AC prongs configured to fit a European AC socket, the AC prongs are slide-able in and out of a body of the plug-in accessory. In another embodiment, the plug-in accessory comprises a charging plug that is tethered by a cable and which is storable in the plug-in accessory and withdraw-able therefrom. Also, a second plug can be provided that can be fitted over the first plug to change its configuration.

In a preferred embodiment, one or more permanent magnets inside the body allow attraction to a mobile device that has a magnetically attracted material associated therewith. In another embodiment, a dual-sided telephone case is provided that is configured to receive said charging accessory on one side thereof and to receive a mobile device on an opposite side thereof.

The present disclosure also provides a cellphone edge protector, that comprises: a body shaped as a rectangular frame to fit around and grasp a cellphone; and at least one resilient band extending across opposing sides of said edge protector for enabling an accessory device to be easily attached to the cellphone by insertion of the accessory device under the at least one resilient band laying against the cellphone with said charging accessory installed under said at least one resilient band and held against the flat rear side of said cellphone by said at least one rubber band. Preferably there are first and second, spaced resilient bands.

Other features and advantages of the present invention will become apparent from the following description of the invention which refers to the accompanying drawings.

BRIEF DESCRIPTION OF THE DRAWING(S)

Figure 1:
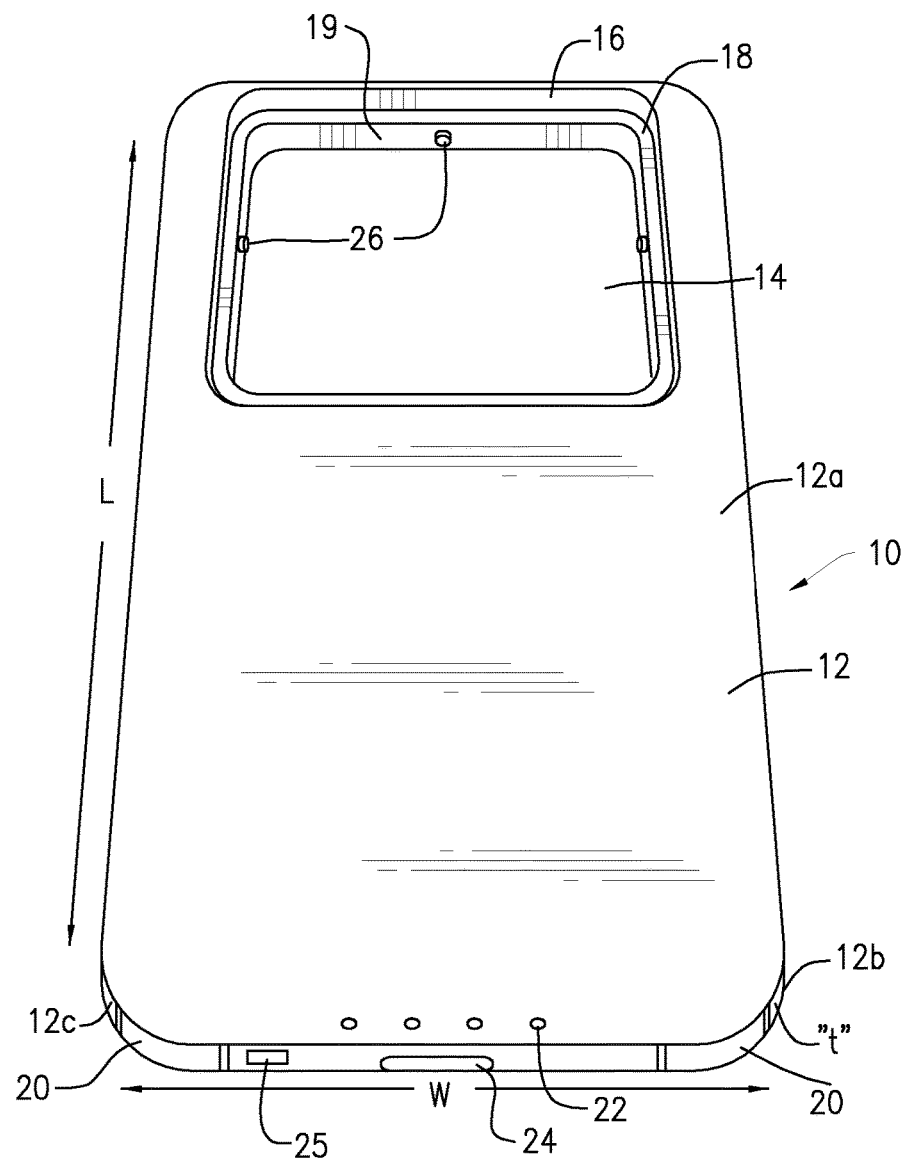
FIG. 1 is a perspective of a slim/flat form-factor accessory battery module for cellphones, with an embedded window for receiving accessory devices.
Figure 3A:
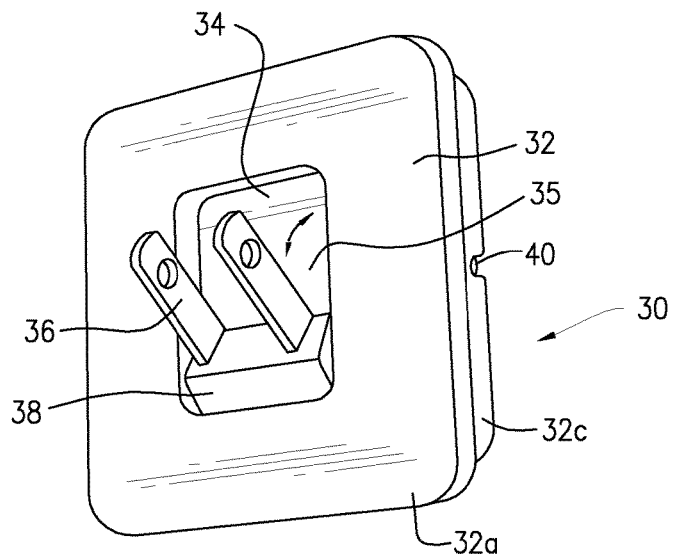

FIG. 3a perspectively shows a charger with AC prongs that can be selectively and interchangeably installed into the battery module of FIG. 1.

Figure 3B:
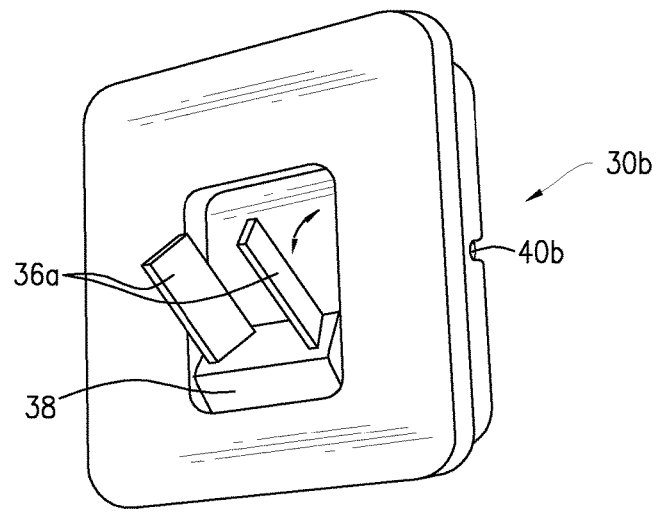
Figure 3C:
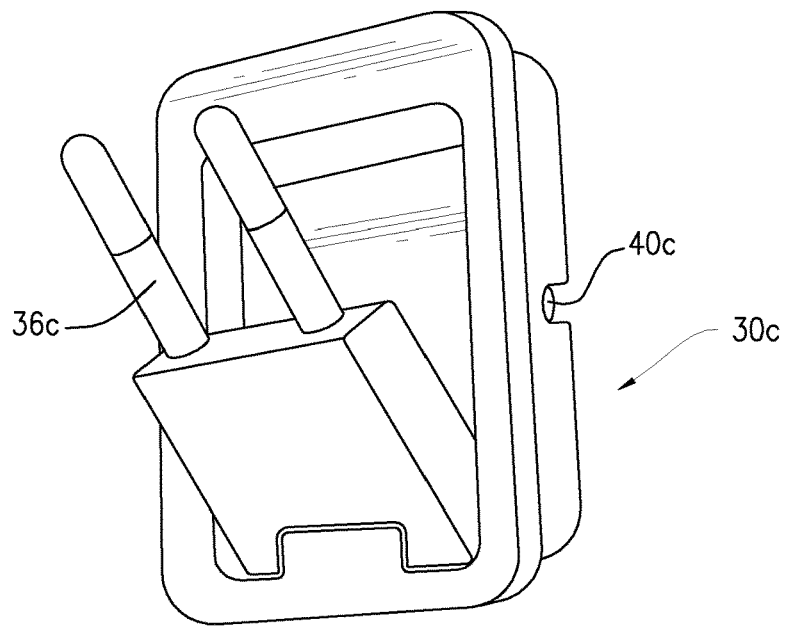
Figure 3D:
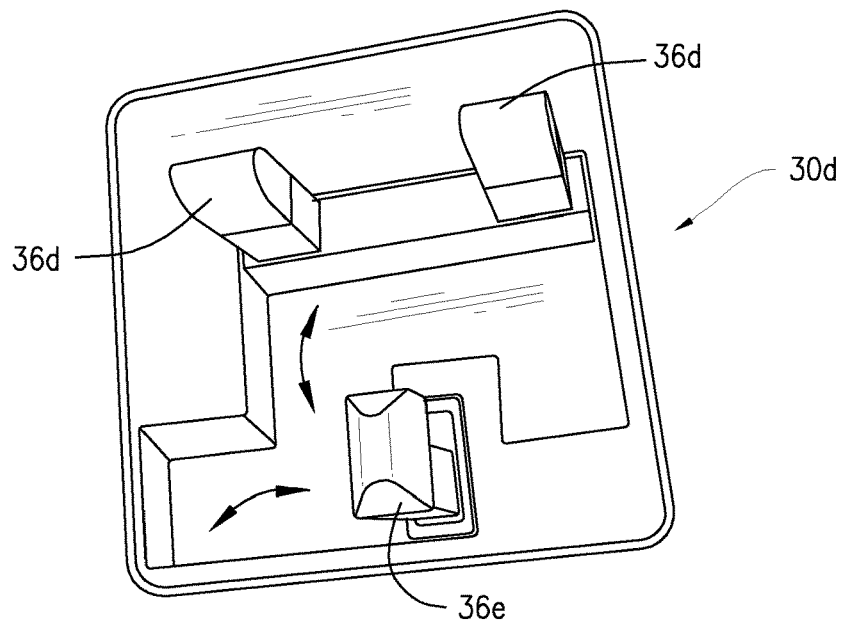

FIGS. 3b, 3c and 3d show electrical chargers that are receivable within the slim battery module of FIG. 1, but which are provided with AC prong configurations that fit, respectively, the Australian, European and British AC socket configurations.

Figure 3E:
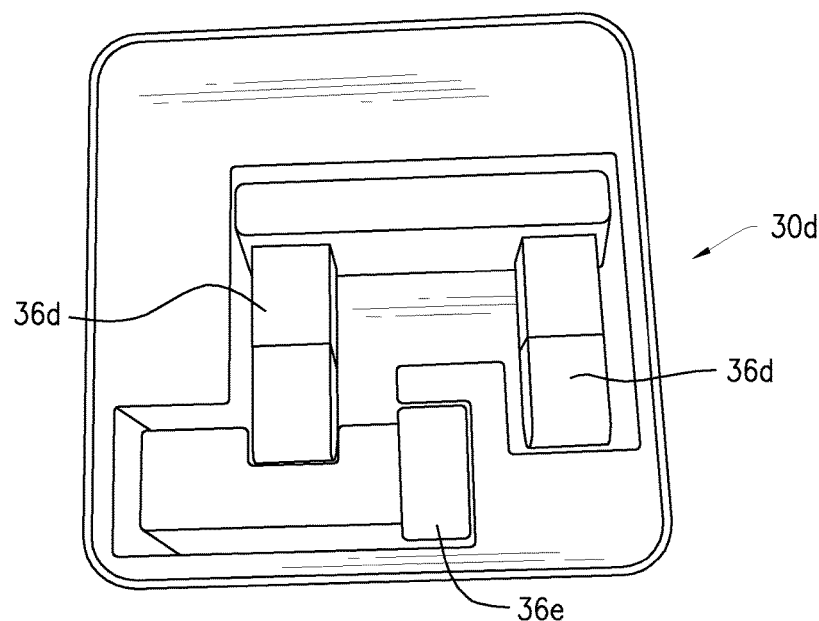

FIG. 3e shows the charger circuit of FIG. 3d in a collapsed configuration of the AC prongs.

Figure 4:
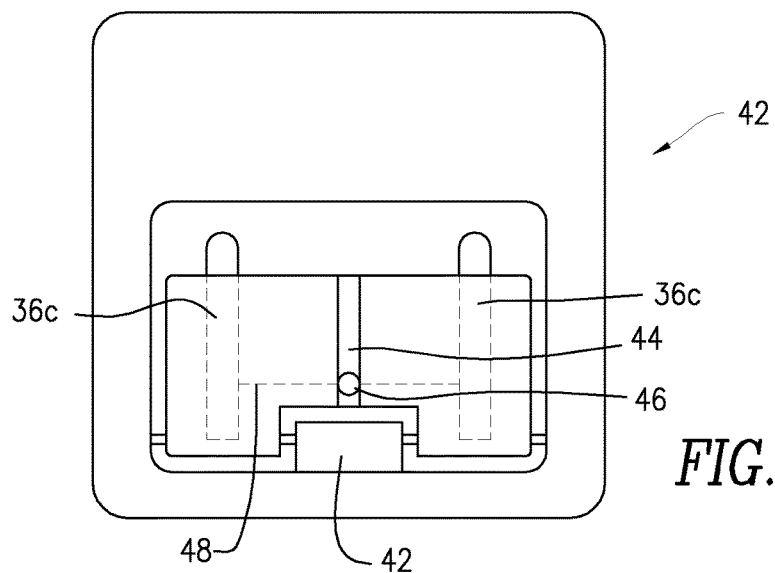

FIG. 4 shows a variation of the charger of FIG. 3c.

Figure 5A:
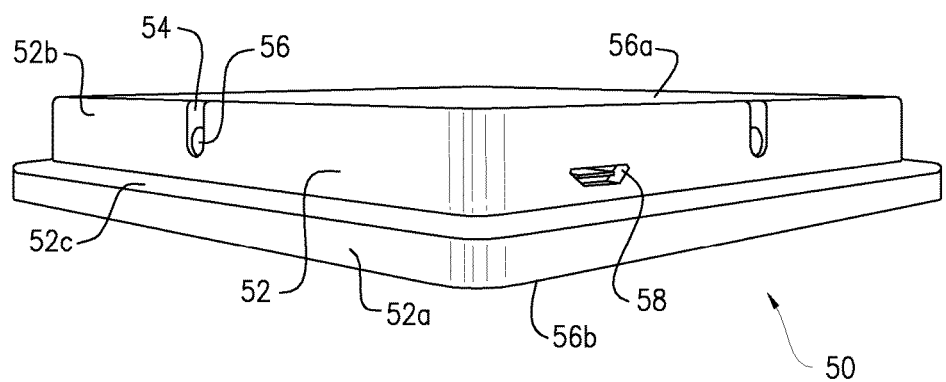

FIG. 5a illustrates a charger module that can be installed into the battery module of FIG. 1, but which also can be used independent to directly charge a mobile device.

Figure 5B:
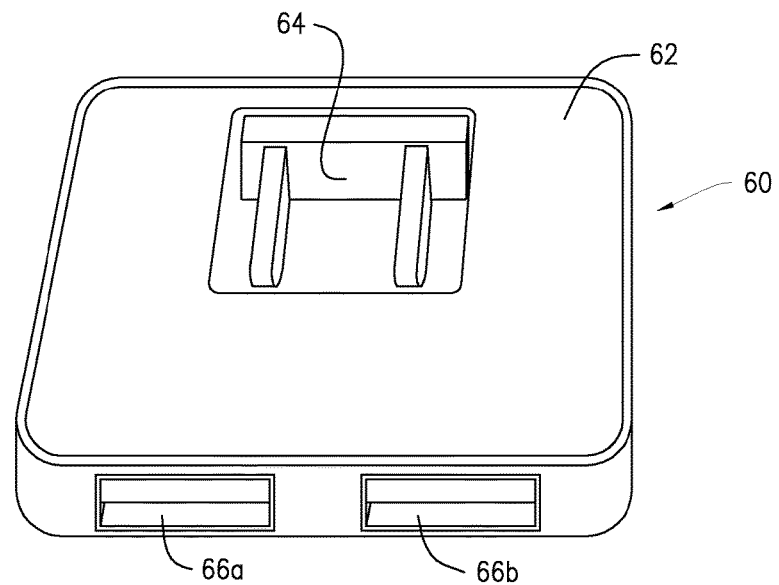

FIG. 5b shows a stand-alone, slim form-factor charger, in a configuration that enables the charger to be stored in a man's wallet.

Figure 5C:
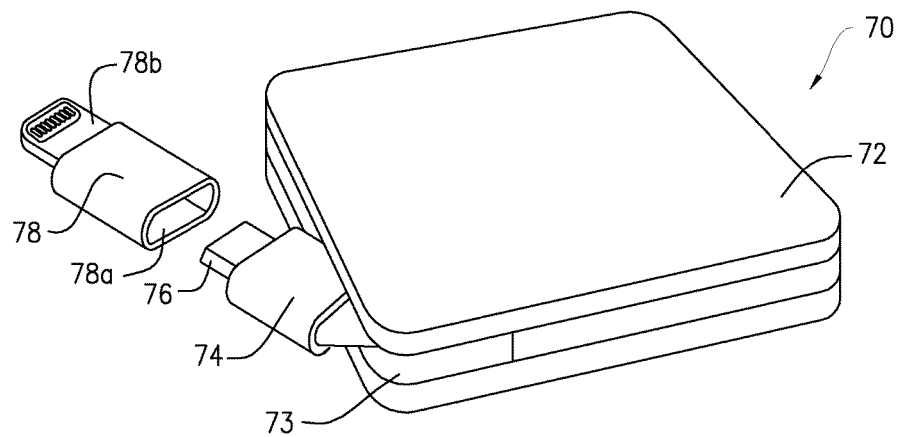

FIG. 5c perspectively depicts a cellphone charger similar to the charger of FIG. 5b, but including a charger plug that can be stored/withdrawn from the charger body and which can be used with different cellphone styles.

Figure 6:
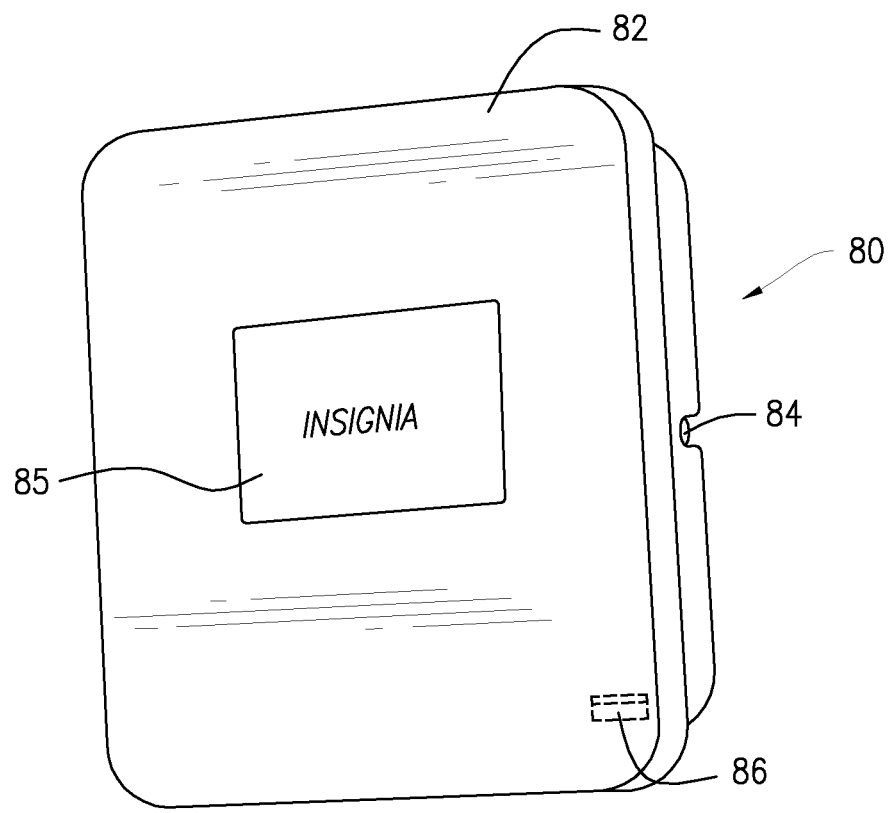

FIG. 6 perspectively shows an additional, accessory battery that can be combined with the slim form factor battery module of FIG. 1, to increase the overall battery capacity.

Figure 7:
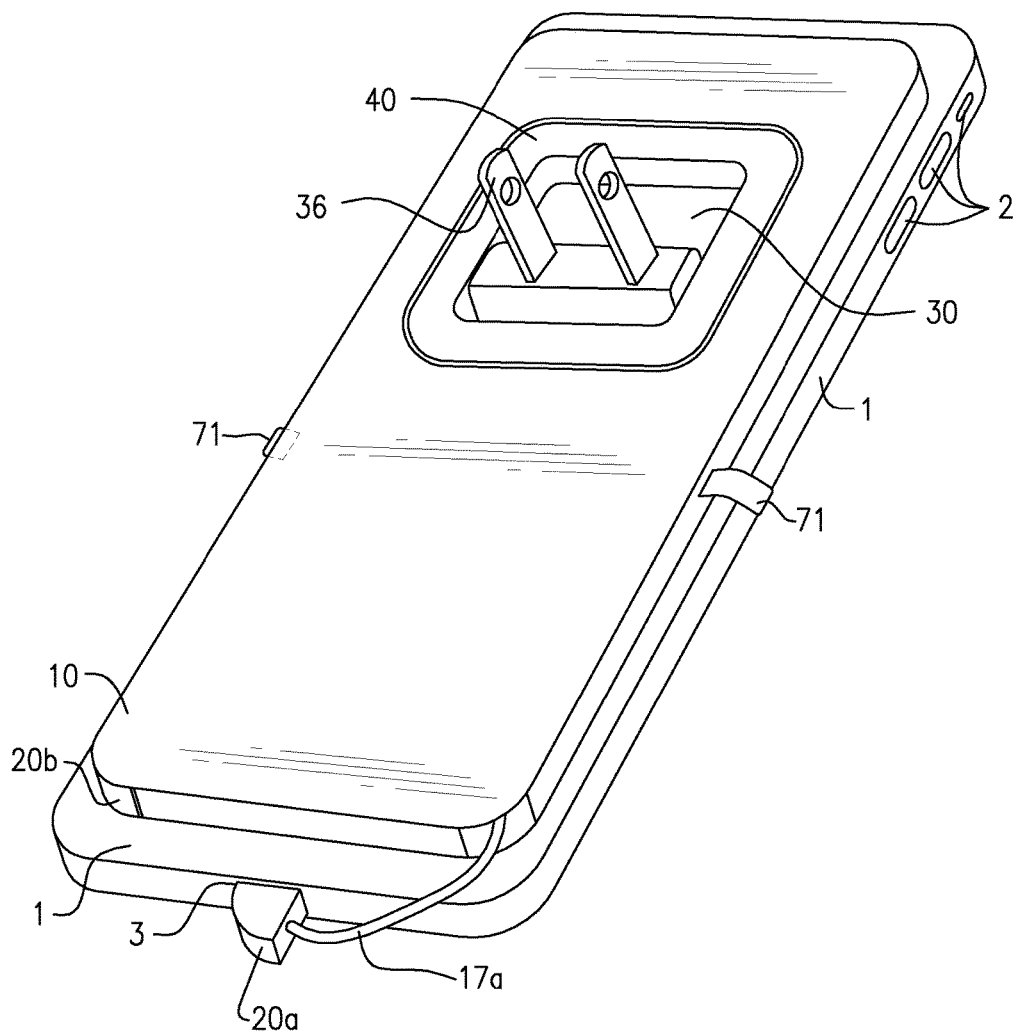

FIG. 7 perspectively illustrates the combined assembly of the battery module of FIG. 1, fitted with an electrical charger, and placed against the cellphone and electrically coupled thereto to provide additional battery capacity and charging current to the mobile phone.

Figure 8:
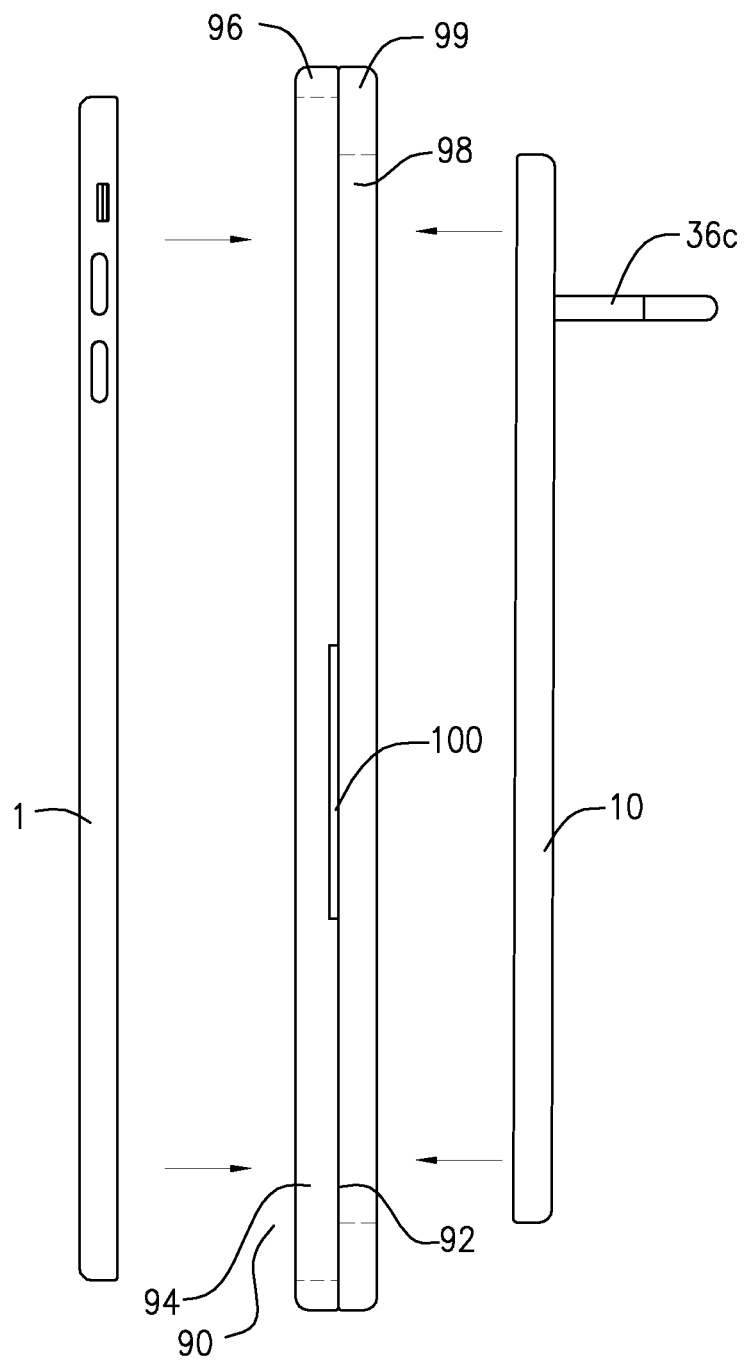

FIG. 8 illustrates a two-sided, telephone case which can be used to store at opposite sides thereof a cellphone and the battery module and charger of FIG. 1.

Figure 9:
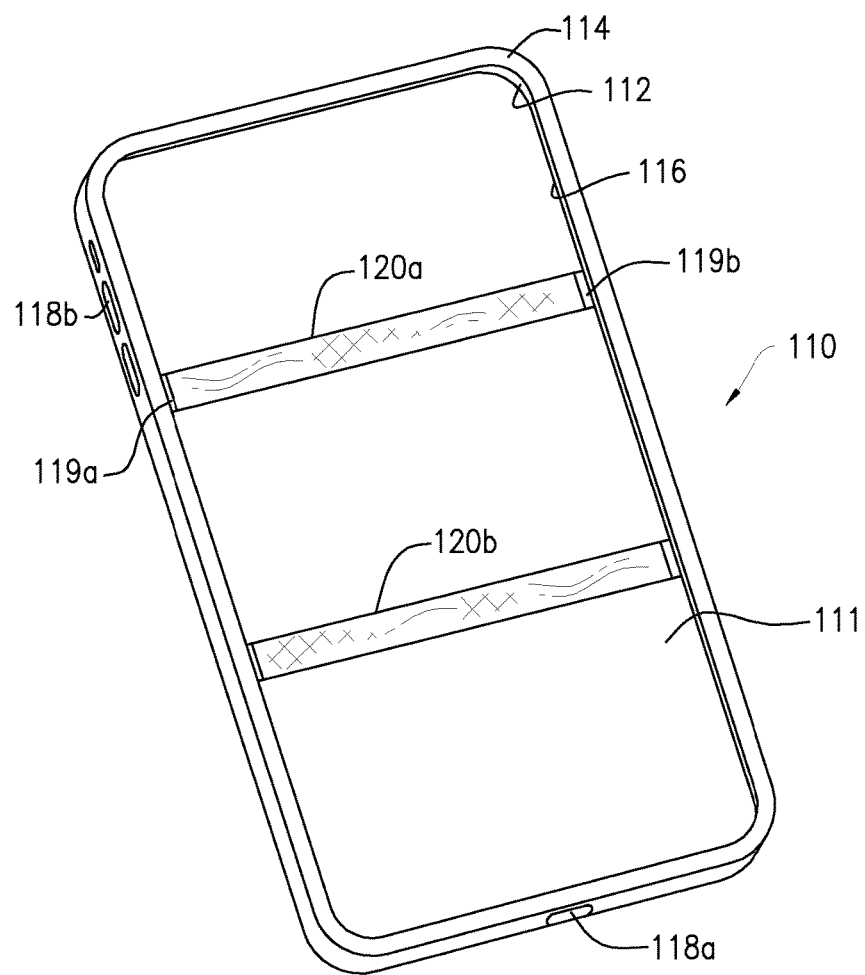

FIG. 9 perspectively illustrates a cellphone protector that can be fitted around the edges of a cellphone to protect it against a fall, but including resilient or rubberized bands on the backside of the protector that can be utilized to secure the battery module of FIG. 1 to the cellphone.

Figure 10:
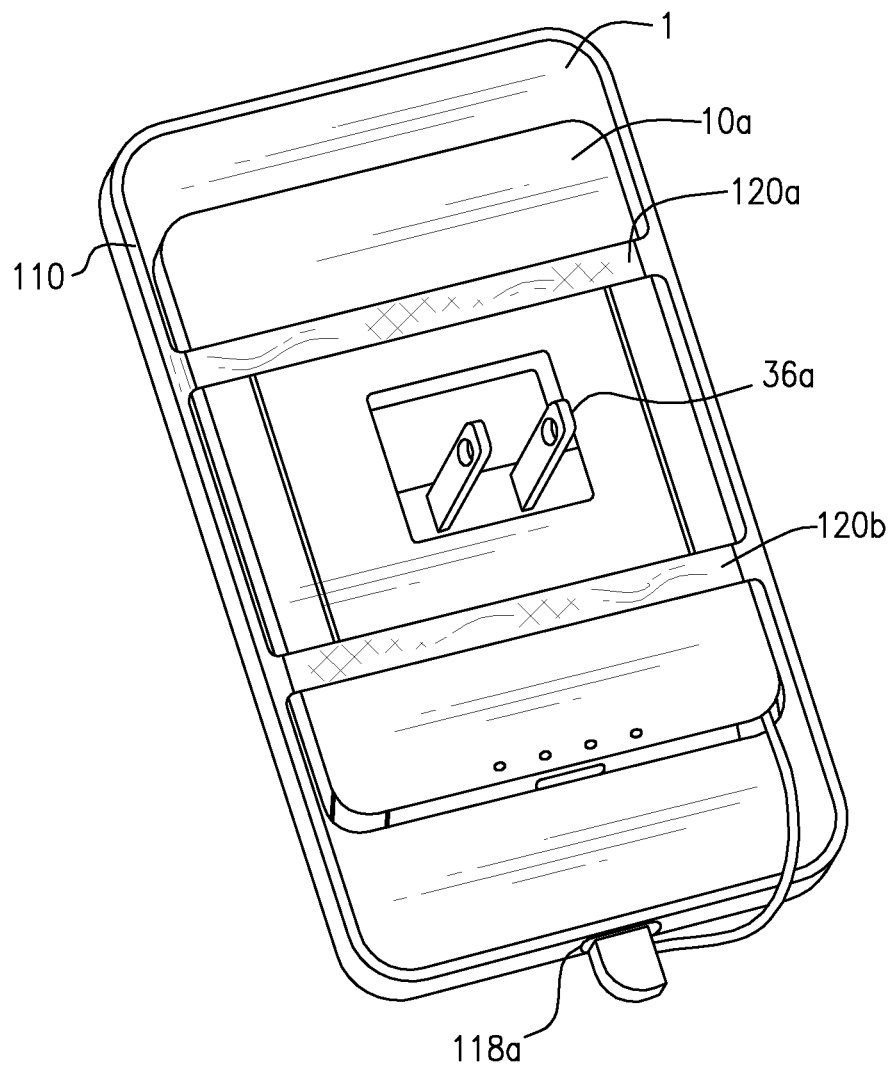

FIG. 10 illustrates the cellphone protector of FIG. 9, with the device of the present invention utilized therewith.

Figure 11:
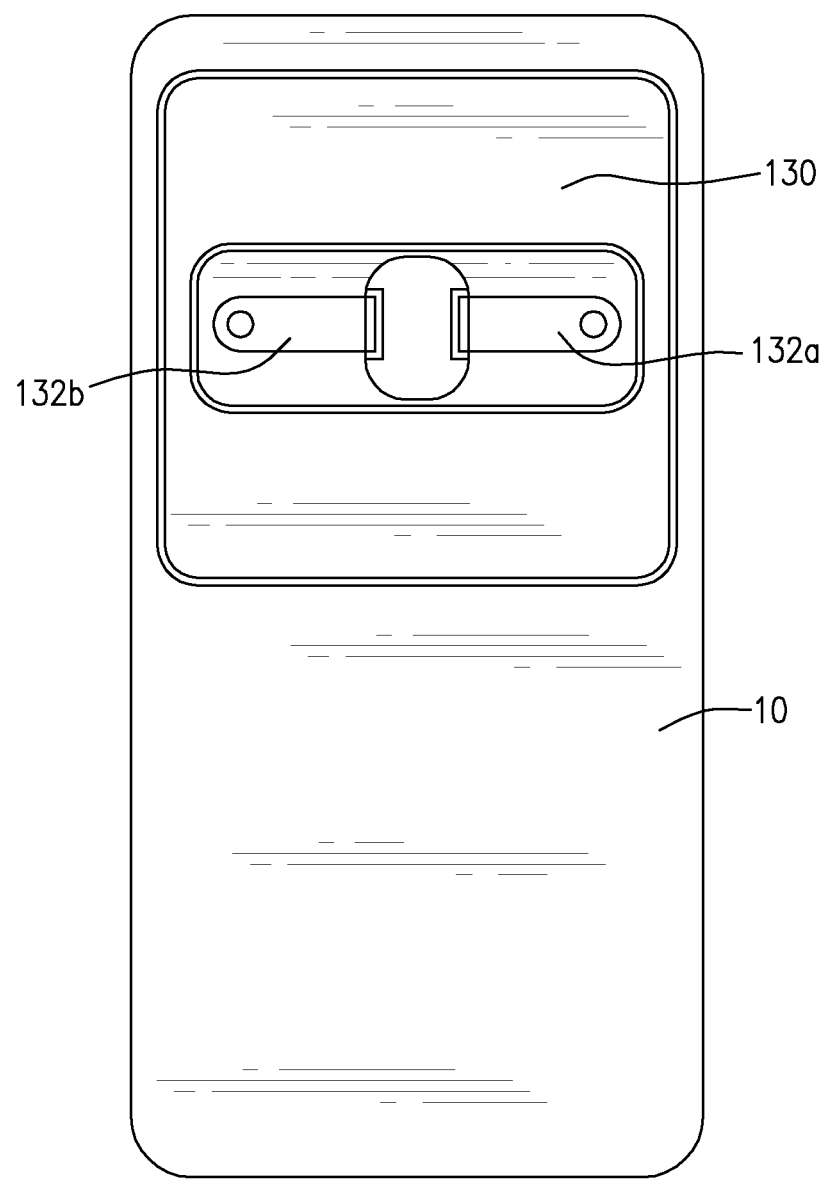

FIG. 11 illustrates the battery module of FIG. 1, with a charger installed therein but having an AC prong configuration wherein the prongs fold away in opposite directions.

Figure 12:
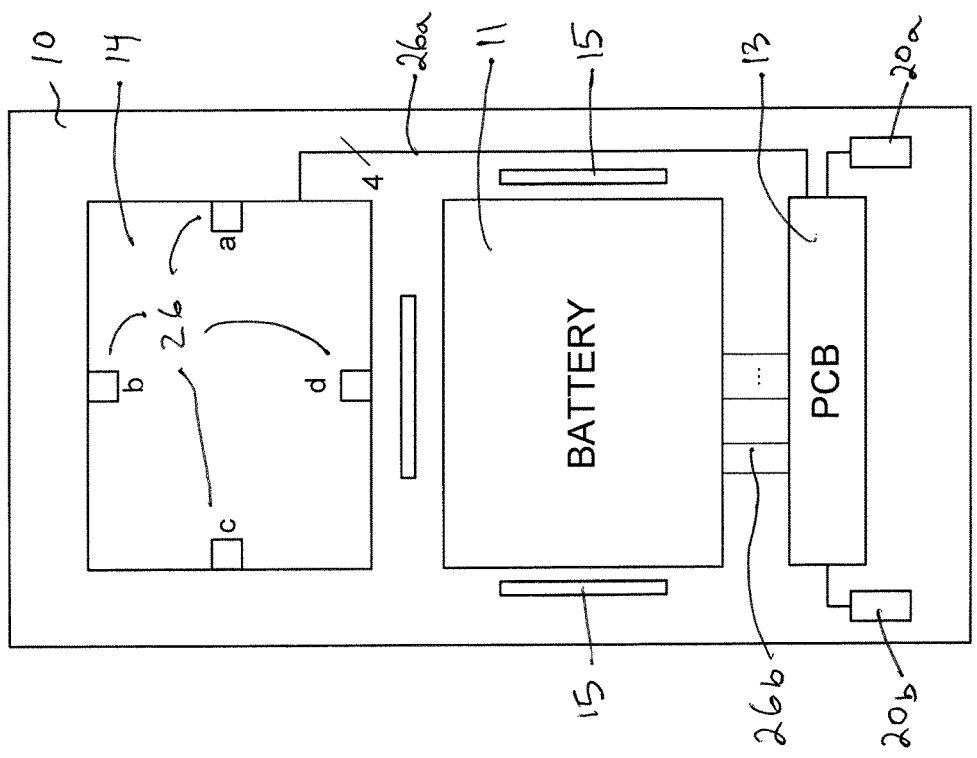

FIG. 12 is a schematic diagram of internal components of the battery module and internal charging circuit of FIG. 1.

Figure 13:
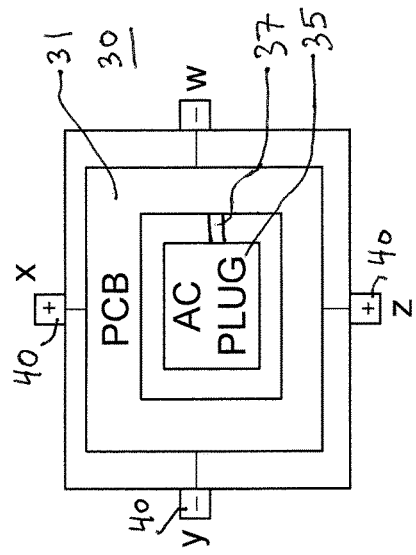

FIG. 13 is a schematic diagram of internal components of the chargers illustrated, for example, in FIGS. 3a, 3b, etc.

Figure 14:
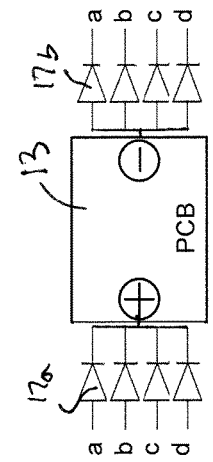

FIG. 14 is an electrical diagram explaining a principle of operation of the present invention.

DETAILED DESCRIPTION OF EMBODIMENTS OF THE INVENTION

Referring to the drawings, for quicker grasping of the overall concept of the present invention, initial reference is made to FIG. 7 which shows a conventional cellphone 1, for example an iPhone, lying front face down and having attached to the rear surface thereof a battery pack or module 10 that incorporates a removable charger module 30 with pivotal AC prongs 36. The battery module 10 has a normally concealed charging cable 17a and an accompanying telephone compatible charging plug 20a which is selectively attachable to the cellphone 1 to charge its internal battery. The shape, dimensions and thickness of the battery module 10 allows it to be palm-held while using the telephone, as the thickness thereof is substantially the same as a typical cellphone, on the order of less than 10 mm and preferably between 5 to 7 mm. The battery module 10 is illustrated more fully in FIG. 1 and one example of its removable charger is illustrated in FIG. 3a.

Referring to FIG. 1, the battery module 10 has a body 12 with a flat upper surface 12a, a flat bottom surface 12b (which is generally parallel to the surface 12a) and a circumscribing peripheral 12c. Preferably, the corners of the package are rounded, as shown. The battery module has a length "L," a width "W" and a thickness "t". As noted, the thickness is on the order of less than 10 mm and preferably between 5 to 7 mm. Preferably, the width and length dimensions are in the ranges 50 mm to 80 mm, and 75 mm to 110 mm.

A special feature of the battery module 10 resides in the generally rectangular (or square shaped) window preferably passing therethrough, and the purpose of which is to matingly receive therein a complementarily-shaped charger module that can charge an internally provided battery of the battery module 10, as more fully explained further on.

The window 14 is defined by a larger opening 16 which tapers inwardly into a horizontal ledge or step 18, and then including a more constricted bottom opening which is defined by the vertical surrounding wall 19. The shape of the window opening 14 and its peripheral walls that define it are constructed to matingly accept the charger module and AC plug illustrated in FIG. 3a, preferably in any rotational orientation of the charger module shown in FIG. 3a. At each of the four bottom walls 19 is provided, at the center thereof, a projecting electrical contact 26 (three are shown in FIG. 1). Further, the battery module 10 has retrievable connectors 20 at the bottom right and left corners thereof (see FIG. 2) as well as an on/off switch 24 and four miniature LEDs 22 that are lit to indicate the level of charge of the internal rechargeable battery 13 of the module 10 (see FIG. 12). Optionally, the battery module 10 can also be provided with a micro-USB recharging/charging port 25, and its internal battery recharged through said micro-USB recharge port 25.

Figure 2:
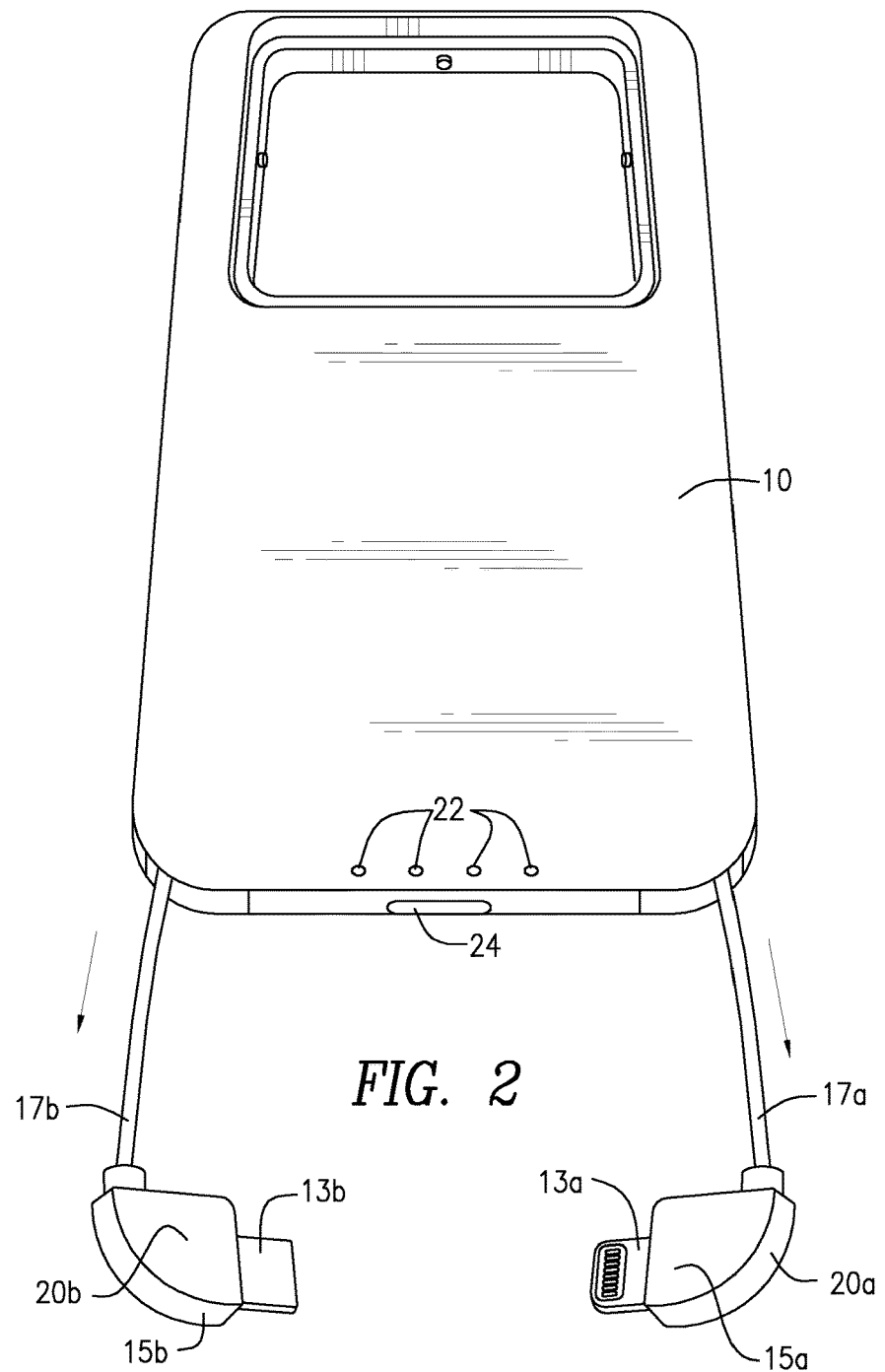
FIG. 2 is a perspective of the slim form factor accessory battery module of FIG. 1 showing charging plugs that can be used with an iPhone style cellphone or an Android phone, selectively.

Referring to FIG. 2, to connect the battery module 10 to a cellphone, for example an Apple cellphone or an Android-based cellphone, one or the other of the charging plugs 20a (Apple) or 20b (Android) are withdrawn from their storage place within the interior of the battery module 10, allowing for an extension of 2 to 3 inches via the respective cable 17a, 17b and thereby insert the appropriate charging plug 13a, 13b into the cellphone which as noted can be an Apple or an Android phone. The surfaces 15a, 15b of the respective plugs 20a, 20b are curved to match the corresponding shape of the body of the battery module 10, at the corners thereof.

Thus, the flat, slim form-factor battery module can be placed (as shown in FIG. 7) against the back side of the cellphone, electrically tethered thereto and by pressing the on/off button 24 initiate charging the cellphone 1.

For added flexibility, the battery module 10 is capable of being recharged, either standing-alone or even while being tethered to the cellphone 1, through the charging device or module 30, shown in FIG. 3a. The charger module 30 has a pair of U.S. style AC prongs 36 that jut out from a pivoting body 38, thereby allowing the prongs 36 to be stowed away in the storage 34. The charger 30 has an upper body portion 32a, a bottom body 32b, and four centrally located, recessed electrodes 40, at each sidewall, that are intended to mate with the corresponding jutting electrical contacts 26 in the window 14 of the module 10 as shown in FIG. 1. When AC power is applied through the prongs 36, that power is rectified and converted into a DC charging voltage by a charger circuit (FIG. 13), whereby DC voltage that is configured to charge the internal battery 11 (of module 10) and thereby the cellphone 1 can be applied via the mating of the electrical contacts 40. Preferably, the overall thickness of the generally square-shaped charger 30 from the upper surface thereof to the bottom surface thereof matches the thickness "t" of the battery module 10. In another embodiment (not shown), the prongs 36 are located on the other side of the module 30. In this configuration, when the combined battery/charger assembly has been inserted into an AC socket, pulling the assembly out of the AC socket will not tend to separate the charger and the battery module from each other.

The charger modules 30b (FIG. 3b), 30c (FIG. 3c) and 30d (FIG. 3d) are generally similar if not identical to the charger 30 in FIG. 3a, except that the prongs 36a in FIG. 3b is configured so that the main body planes of the prongs 36a are non-parallel to each other to accommodate Australian AC sockets. The AC prongs 36c (FIG. 3c) accommodate European AC sockets and the prongs 36d and 36e (FIG. 3d) accommodate UK AC sockets. All of the prongs pivot in and out of the respective cavity provided in the charger body, whereby when not used as chargers, the surface of the battery module 10 remains flat to the touch, on both sides thereof, with the charger installed. Preferably, the charger dimensions are about 50 mm by 50 mm.

FIG. 3e illustrates this special way in which the UK AC prongs of FIG. 3d has been constructed, whereby two of the prongs 36d pivot downward in the arrow direction shown, whereas the third prong 36e pivots sideways and has a cutout to accommodate one of the prongs 36d. This makes for a very thin package of this charger with its stored AC prongs providing a module thickness that does not exceed about 7 mm or 8 mm in accordance with the present invention.

Referring to FIG. 4, it is noted that the European AC prong configuration of FIG. 3c requires a large footprint/space in the module 30c (FIG. 3c), which does not leave much space inside the overall plug 30c for an electronic converter circuit to generate a DC voltage. FIG. 4 provides a solution by reducing the size of the plug 42 by having the AC prongs 36c coupled to a slider 46 that is mechanically coupled at 40a to the prongs 36c and allows the prongs 36 to be pivoted out from the space 42a and then extended as shown in the figure.

Functionally, and referring to FIGS. 12 to 14, the battery module 10 contains within its interior a physical, rechargeable battery 11 which is coupled by electrical wires 26b to an internal PC board 13 which contains various well-known charging circuits, for example as illustrated in the incorporated by reference patents. Normally, the stored power in the battery 11 is processed or otherwise prepared by the PCB 13 to be delivered as an electrical charging current through either and/or both of the charging plugs 20a and 20b, previously described. The PCB 13 is also coupled by four electrical conductors 26a to the AC receptacle 14 which has the 4 electrical contacts 26, identified in FIG. 12 as contacts a, b, c and d.

Thereby, when the charger module 30 (FIG. 13) is inserted into the charger receptacle 14, AC line power from the AC plug 35 provided via the AC lines 37 to the charger PCB 13 (which contains a conventional AC to DC convertor) is then rectified to DC power that is provided to the four nodes a, b, c and d of the charger module 10. The contacts 40 are identified herein by sub-reference numerals w, x, y and z. Optionally, the positive side of the DC power is provided at the nodes x and z while the negative or ground power is provided to the nodes w and y. Thereby, when the charger module 30 is inserted into the receptacle 14 (in the battery module 10), the positive and ground voltage will be provided at the respective electrodes a, b, c, d.

An added feature of the invention is that functionally, it does not matter in which rotational orientation the charger module 30 is inserted. This is accomplished owing to the configuration shown in FIG. 14, which shows that all four nodes a, b, c, d are routed through forwardly biased diodes 17a to the positive terminal of the PCB 13, while the identical nodes are also coupled via reversed biased diodes 17b to the negative (ground) terminal of the PCB 13. Accordingly, as long as there is a positive voltage at any of the nodes a, b, c, d, there will be supplied power to the positive node of the PCB 13 and at the same time the negative ground terminal will always be available via at least one of the a, b, c, d power nodes which is at ground level.

When a charging DC voltage/current is provided through the line 26a to the PCB 13, that power is utilized to recharge the internal battery 11 and can also be used to directly provide a charging current through the cellphone charging plugs 20a, 20b.

A significant advantage of the invention derives from the ability to insert into the receptacle 14 in the battery module 10 differently configured AC plugs as well as other accessory devices. Referring to FIG. 5a, this particular device 50 is similar to the previously described devices and also has the same general configuration with a plug 50 that has a lower and wider body portion 52a, a recessed body portion 52b, a ledge 52c which is complementary to the ledge in the receptacle 14, grooves 54 and in those grooves conductors 56. When the module 50 is inserted into the receptacle 14, contact is made between the recessed conductors and the protruding electrodes in the receptacle 14 as previously described. In addition, this module also has a built-in charging plug 58. This charging plug 58 allows using charging module 50 as a standalone charger, which can be directly connected to a cellphone to charge the cellphone while the module 50 is inserted into an ordinary household AC socket as previously described. This charging plug 58 can be provided at the location shown, but it also can be provided either at the top surface 56b of the plug 56a or at its bottom surface or at any location thereof. In fact, a DC power source can be inserted into the plug 50a when located on another surface, to thereby charge the accessory battery 10 through the module 50 with DC power (instead of AC power). While the receptacle/window 14 has been depicted above with four electrodes, one in each wall defining the window 14, the invention also includes providing many more electrodes located along one or all four of the walls defining the window 14, and providing a variety of accessories that fit into the window, for example an accessory that mimics an SD card and like devices, and these other electrodes can route signals or data lines to the connectors 20a, 20b, for supplying said signal lines to the cellphone, or other mobile devices via signal paths other than through the electrodes depicted in the current drawings.

Referring to FIG. 5b, the charger module 60 has an AC plug 64, a body 62 and two ordinary USB ports 66a and 66b so that it can be used as a standalone device to charge cellphones and other electronic devices. The size of this module is on the order of about 40 to 50 mm by 40 to 50 mm by 5 to 8 mm, easily fitting in a man's wallet or pocket In FIG. 5c, the charger module 70 has a body 72 with a charging plug 74 that is storable in the space 73 as previously described. The charger plug 74 has a male connector 76 that fits, for example, Android cellphones. To convert that Android charging plug 76 to an Apple compatible plug, the additional accessory 78 has a socket 78a that routes the signals to an Apple compatible DC plug 78b, as shown.

In FIG. 6, the instant invention provides a rectangularly-shaped body identical in shape and size to the charger modules previously described, and complementarily fitting within the receptacle 14, except that this device constitutes just a further DC battery 80 that has a body 82 and in the body a physical battery that can be recharged through a USB port 86. When this body is inserted into receptacle 14 via its contacts 84, it simply increases the battery capacity of the internal battery 11 (FIG. 12).

The module of FIG. 6 has been described as containing an internal battery. However, the nodule 80 can be constructed alternatively as a micro-SD memory port data module which can be utilized through its contacts to be routed to the cellphone and be used as a storage device. As yet another alternative, the nodule 80, in accordance with another embodiment thereof, can be configured to contain internal speakers and serve as a loudspeaker and data module.

As yet another alternative, the module 80 can be configured as a Qi wireless charging power module which is able to communicate with the internal battery in the cellphone and wirelessly couple the stored electrical energy from the battery module 10 into the internal battery of the iPhone, as presently described. Also, these modules 80 have printed/formed thereon an insignia 85 indicating the module type graphically and/or by words, e.g. speaker, wireless charger, memory, etc.

In general, the internal battery 11 of the present invention (in accordance with an embodiment thereof) has the capacity to deliver 2500 mAh. If the module 80 is configured as an additional battery, it can provide an extra 1000 mAh and increase the overall capacity to 3500 mAh battery power for the cellphone 1.

Naturally, it is an advantage to be able to provide a means for the accessory battery module 10 to be firmly held without moving against the back surface of the cellphone 1. To this end and as shown in FIG. 12, several permanent magnets 15 are embedded within the module 10. When a metallic ferromagnetic thin sheet is attached either to the cellphone 1 or to the inside of a conventional telephone case, that end is achieved by magnetic attraction. But that solution has the disadvantage of the battery module 10 being susceptible of sliding against the rear surface of the cellphone 1.

Addressing the foregoing, and as shown in FIG. 8, the present invention also provides a two-sided telephone case 90 which has an interior space 94 shaped to tightly receive therein the body of the cellphone 1 on one side thereof. On the opposite side thereof, in an interior space 98 separated by a thin wall 92 separating the two spaces, a rear compartment 98 is shaped to perfectly fit the module 10, while adding only negligible, a millimeter or so, thickness therebetween. Further in this embodiment, a very thin, less than a millimeter metallic sheet, preferably rectangular sheet 100, is provided in a regular one-sided telephone case, thereby to keep the module 10 attracted to the telephone by magnetic attraction to the sheet 100.

In FIG. 7, the mobile device 1 is firmly held to the battery module and charger by an elastic band 71 that extends behind the battery module and binds the module and the mobile device to each other, whereby during charging, for example, the mobile device will not slide relative to the module/charger.

Referring to FIGS. 9 and 10, the present invention also discloses a unique protective and fully surrounding edge protector 110 which has inwardly bending edges 114 and 116 and a cushioning body, which when placed over the peripheral wall of the cellphone 1 tightly hugs it and protects the cellphone from shock when hitting the ground. Preferably, the edge protector is made of an inner, rigid but somewhat resilient material to allow insertion of the mobile device into the edge protector, while the outside of the edge protector has a cushioning material, that softens the impact on the mobile device during a fall. No matter how the cellphone falls, the initial contact will be with the edge protector, which (preferably) contains fall cushioning material. Therefore, even though the cellphone is totally exposed front and back, it will be protected. Preferably, the outer surface of the edge protector is rounded and projects a millimeter or so away from the flat front and back surfaces of the phone.

The opening 118a in the edge protector is for the charging plug, while additional openings 118b are for other ports/buttons of the cellphone 1. The edge protector 110 includes, at the rear side, resilient bands 120a and 122b which can be stretched as can be appreciated from FIG. 10 which shows the edge protector 110 tightly hugging and protecting the edges of the cellphone 1 while holding the battery module 10a tucked under the bands 120a, 120b. As a result, the battery module 10a rests directly against the rear surface of the cellphone 1, without any space therebetween. This edge protector is lighter than conventional, comparable telephone cases, do not add any thickness to the back side of the phone, and the protruding edge at the back provides a border around the back of the phone.

The battery module 10a in FIG. 10 is actually considerably shorter than the module 10 in FIG. 1 and its width and length are somewhat smaller than the one in FIG. 1, but its thickness is the same. As a result this module 10a can be stored in a man's wallet when not in use. Naturally, the battery size in this reduced size package would have a smaller capacity as compared that of the larger sized module package. At the same time, the module 10a comfortably rests under the bands, in the space within the edge protector, at the back of the phone. Preferably, the material of the bands 120a, 120b is comprised of or contains very high coefficient of friction material, to hold onto anything tucked under the bands, e.g. paper currency, slips of smooth paper, shiny photos, electronic storage media such as an SD card, the battery module 10a, etc. without slipping, and slipping per se is somewhat blocked by the edge protector.

FIG. 11 shows a somewhat modified AC prong configuration that is provided in the charger plug 130 which can result in more space within the module 130 being available for a charging circuit and even some additional battery capacity.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A universal charging accessory for mobile devices that have a front display side, a flat rear side, and a charging port for a battery of the mobile device, the charging accessory comprising:
 a generally flat and thin body configured to lie flat against the flat rear side of the mobile devices;
 an internal rechargeable battery mounted inside the body of the charging accessory;
 at least one mobile device charging plug configured to be electronically coupled to the charging port of the mobile devices, the at least one charging port being retrievably stowed inside the body; and
 the body having a thickness dimension of less than 8 mm.

2. A universal charging accessory for mobile devices that have a front display side, a flat rear side, and a charging port for a battery of the mobile device, the charging accessory comprising:
 a generally flat and thin body configured to lie flat against the flat rear side of the mobile devices;
 an internal rechargeable battery mounted inside the body of the charging accessory;
 at least one mobile device charging plug configured to be electronically coupled to the charging port of the mobile devices, the at least one charging port being retrievably stowed inside the body; and
 a recess formed in the body of the charging accessory, the recess being provided with a plurality of electrical contacts and the recess being configured for receiving a plug-in accessory therein that is electrically coupled to the charging accessory via said plurality of electrical contacts.

3. The charging accessory of claim 2, wherein the plug-in accessory is an AC charger that includes AC prongs configured to be inserted into a household AC socket and including an AC to DC converter circuit for converting AC power to DC power and to electrically contact with the electrical contacts of the recess to provide DC power to said internal battery.

4. The charging accessory of claim 3, wherein the AC prongs are configured to be able to be plugged into a household AC socket having one of a United States, an Australia, a European, and a UK AC socket configuration.

5. The charging accessory of claim 3, including a charging circuit coupled electronically to the internal battery for converting electrical energy stored in said internal battery to a charging current for the mobile devices battery.

6. The charging accessory of claim 3, including an on/off switch and a charging level display configured to indicate a charge level of the internal battery.

7. The charging accessory of claim 2, wherein said at least one mobile device charging plug comprises first and second charging plugs for enabling selective charging of different type mobile devices.

8. The charging accessory of claim 7, wherein the first and second charging plug have a curved outer surface which matches a curved outer shape of the body of the charging accessory.

9. The charging accessory of claim 2, wherein said plug-in accessory comprises charger contacts located in grooves formed in the plugin accessory to help to assist in preventing human contacts with said charger contacts.

10. The charging accessory of claim 3, wherein said plug-in accessory has UK AC prongs including two prongs that fold down in one direction and a third prong folds in a direction perpendicular to the first direction.

11. The charging accessory of claim 2, wherein said plug-in accessory measures less than 8 mm in thickness.

12. The charging accessory of claim 3, wherein said plug-in accessory comprises AC prongs configured to fit a European AC socket and wherein said AC prongs are slideable in and out of a body of the plug-in accessory.

13. The charging accessory of claim 2, wherein said plug-in accessory comprises a charging plug for charging the internal battery with DC current.

14. The charging accessory of claim 2, wherein said plug-in device comprises at least one USB port.

15. The charging accessory of claim 2, wherein said plug-in accessory comprises a charging plug that is tethered by a cable and which is storable in the plug-in accessory and withdraw-able therefrom.

16. The charging accessory of claim 15, including a second plug that can be fitted over the first plug to change its configuration.

17. The charging accessory of claim 2, including one or more permanent magnets inside the body for allowing attraction to a mobile device that has a magnetically attracted material associated therewith.

18. The charging accessory of claim 2, in combination with a dual-sided telephone case configured to receive said charging accessory on one side thereof and to receive a mobile device on an opposite side thereof.

19. A cellphone edge protector, comprising:
 a body shaped as a rectangular frame to fit around and grasp a cellphone; and
 at least one resilient band extending across opposing sides of said edge protector for enabling an accessory device to be easily attached to the cellphone by insertion of the accessory device under the at least one resilient band abutting against the cellphone with said charging accessory installed under said at least one resilient band and held against the flat rear side of said cellphone by said at least one rubber band.

20. The charging accessory of claim 19, wherein said at least one resilient band comprises at least first and second, spaced resilient bands.

* * * * *